United States Patent
Emi et al.

(10) Patent No.: US 10,743,139 B2
(45) Date of Patent: Aug. 11, 2020

(54) WIRELESS SYSTEM DEVICE AND WIRELESS COMMUNICATION CONTROL METHOD

(71) Applicant: Panasonic Intellectual Property Management Co., Ltd., Osaka (JP)

(72) Inventors: Tetsuichi Emi, Kanagawa (JP); Kouji Takahashi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 36 days.

(21) Appl. No.: 16/082,559

(22) PCT Filed: Feb. 1, 2017

(86) PCT No.: PCT/JP2017/003522
§ 371 (c)(1),
(2) Date: Sep. 6, 2018

(87) PCT Pub. No.: WO2017/159095
PCT Pub. Date: Sep. 21, 2017

(65) Prior Publication Data
US 2019/0116460 A1  Apr. 18, 2019

(30) Foreign Application Priority Data
Mar. 16, 2016  (JP) ................. 2016-052206

(51) Int. Cl.
*H04W 4/02* (2018.01)
*H04B 1/04* (2006.01)
(Continued)

(52) U.S. Cl.
CPC .............. *H04W 4/027* (2013.01); *H04B 1/04* (2013.01); *H04B 1/3822* (2013.01);
(Continued)

(58) Field of Classification Search
CPC ......... H04W 4/027; H04W 4/46; H04W 4/44; H04W 4/029; H04W 4/40; H04W 16/00;
(Continued)

(56) References Cited

U.S. PATENT DOCUMENTS

| | | | |
|---|---|---|---|
| 8,274,405 B2 * | 9/2012 | Bos ...................... | G07B 15/063 340/10.1 |
| 9,319,933 B2 * | 4/2016 | Alexander .......... | H04W 74/085 |
| 2004/0185850 A1 * | 9/2004 | Ikeda .................... | H04W 48/18 455/435.3 |

FOREIGN PATENT DOCUMENTS

| | | | | |
|---|---|---|---|---|
| EP | 3121562 A1 * | 1/2017 | ............. | G01C 21/20 |
| JP | 2015-177370 | 10/2015 | | |

OTHER PUBLICATIONS

International Search Report of PCT application No. PCT/JP2017/003522 dated Apr. 18, 2017.

* cited by examiner

*Primary Examiner* — Yemane Mesfin
*Assistant Examiner* — Intekhaab A Siddiquee
(74) *Attorney, Agent, or Firm* — Greenblum & Bernstein, P.L.C.

(57) ABSTRACT

A wireless system device is a device to be mounted on a vehicle. The wireless system device includes a wireless communication unit, a condition detector, a position obtainer, and an operation controller. The wireless communication unit transmits a radio signal. The condition detector detects a first timing and a second timing. The first timing is a timing when the vehicle shifts from an operation state to a stop state. The second timing is a timing when the vehicle shifts from the stop state to the operation state for a first time after the first timing. The position obtainer obtains a first position and a second position. The first position and the second position are positions where the vehicle is at the first (Continued)

timing and the second timing, respectively. The operation controller controls operation of the wireless communication unit based on a distance between the first position and the second position.

12 Claims, 5 Drawing Sheets

(51) Int. Cl.
*H04B 1/3822* (2015.01)
*H04W 16/00* (2009.01)
*H04W 4/46* (2018.01)
*H04W 4/44* (2018.01)
*H04W 4/029* (2018.01)
*H04W 52/02* (2009.01)
*H04W 88/02* (2009.01)
*H04W 4/40* (2018.01)

(52) U.S. Cl.
CPC ............. *H04W 4/029* (2018.02); *H04W 4/44* (2018.02); *H04W 4/46* (2018.02); *H04W 16/00* (2013.01); *H04W 52/0254* (2013.01); *H04W 4/40* (2018.02); *H04W 88/02* (2013.01)

(58) Field of Classification Search
CPC .... H04W 52/0254; H04W 88/02; H04B 1/04; H04B 1/3822
USPC ........................................................ 370/329
See application file for complete search history.

WIRELESS SYSTEM DEVICE AND WIRELESS COMMUNICATION CONTROL METHOD

This application is a U.S. national stage application of the PCT International Application No. PCT/JP2017/003522 filed on Feb. 1, 2017, which claims the benefit of foreign priority of Japanese patent application 2016-052206 filed on Mar. 16, 2016, the contents all of which are incorporated herein by reference.

TECHNICAL FIELD

The present disclosure relates to a wireless system device to be mounted on a vehicle and a wireless communication control method that controls a wireless communication unit mounted on a vehicle.

BACKGROUND ART

Conventionally, the safe driving support technology is put in practical use in which a vehicle-to-vehicle (V2V) communication system and a road-to-infrastructure (V2I) communication system are used.

For example, an on-vehicle device mounted on a vehicle sends (hereinafter, "transmits" is used) a radio signal vehicle information indicating a position, a running speed, and the like of a self-vehicle, obtained by using the global navigation satellite system (GNSS) and various sensors; and the on-vehicle device receives vehicle information similarly transmitted from another vehicle in the periphery. Further, such an on-vehicle device receives road information indicating a condition of a pedestrian at an intersection, traffic condition, or the like transmitted from a roadside device when passing by near the roadside device. Note that the above-described vehicle information is received not only by the on-vehicle device in another vehicle but also by a near-by roadside device.

Peripheral environment of each vehicle changes from time to time. Further, there is much information that needs to be immediately transferred, such as occurrence of a traffic accident. Therefore, an on-vehicle device compatible with the vehicle-to-vehicle communication system and the vehicle-to-infrastructure communication system (hereinafter, the device is referred to as "wireless system device") is typically configured to autonomously and cyclically (for example, at a cycle of 100 ms) transmit vehicle information.

The above-described exchange of information makes it possible to anticipate potential danger and accident in real time and with a high degree of accuracy; therefore, it is possible to accurately provide information, alert, and the like for preventing danger and accident to drivers and pedestrians.

Along with export of vehicles to foreign countries, cases are increasing in which a wireless system device mounted on a vehicle is brought out to foreign countries. However, in this case, there will be a problem of radio wave interference with other wireless communication systems. That is because wireless communication systems and frequency bands used for safe driving assistance are not standardized worldwide, there are many systems in the world, and in addition, new systems are under consideration for use. For example, while the V2V communication system and the V2I communication system using the 760 MHz band are in practical use in Japan, a system using the 5.9 GHz band is scheduled to be in practical use in North America and Europe.

To address the problem mentioned above, for example, one can avoid the radio wave interference when a vehicle is exported, by employing the technique described in PTL 1 (hereinafter, referred to as "conventional art"). In the conventional art, by using positional information indicating a controlled area in which sending of a radio signal is inhibited, it is determined whether a current position is entering the controlled area, and when it is determined that the current position is entering the controlled area, sending of a radio signal is limited or stopped.

CITATION LIST

Patent Literature

PTL 1: Unexamined Japanese Patent Publication No. 2015-177370

SUMMARY OF THE INVENTION

The present disclosure provides a wireless system device and a wireless communication control method with which it is possible to more reliably avoid occurrence of radio wave interference with other wireless communication systems.

A wireless system device of the present disclosure is a wireless system device to be mounted on a vehicle. The wireless system device includes a wireless communication unit, a condition detector, a position obtainer, and an operation controller. The wireless communication unit transmits a radio signal. The condition detector detects a first timing and a second timing. The first timing is a timing when the vehicle shifts from an operation state to a stop state. The second timing is a timing when the vehicle shifts from the stop state to the operation state for a first time after the first timing. The position obtainer obtains a first position and a second position. The first position is a position where the vehicle is at the first timing. The second position is a position where the vehicle is at the second timing. The operation controller controls operation of the wireless communication unit based on a distance between the first position and the second position.

A wireless communication control method of the present disclosure is a wireless communication control method that controls a wireless communication unit mounted on a vehicle. The wireless communication control method includes: detecting a first timing when a vehicle shifts from an operation state to a stop state; and obtaining a first position that is a position where the vehicle is at the first timing. Further, the wireless communication control method includes: detecting a second timing when the vehicle shifts from the stop state to the operation state for a first time after the first timing; and obtaining a second position that is a position where the vehicle is at the second timing. Further, the wireless communication control method includes controlling operation of transmission of a radio signal by a wireless communication unit based on a distance between the first position and the second position.

The present disclosure makes it possible to more reliably avoid occurrence of radio wave interference with other wireless communication systems.

DESCRIPTION OF EMBODIMENT

Prior to description of an exemplary embodiment of the present disclosure, a problem with the conventional art will be described briefly. In the conventional art, if it is impossible to obtain positional information indicating a controlled area where sending of a radio signal is inhibited or if obtained positional information is not correct, radio wave interference with other wireless communication systems can be caused. Therefore, there is a need for a technique that can more reliably avoid occurrence of radio wave interference with other wireless communication systems.

Hereinafter, an exemplary embodiment of the present disclosure will be described in detail with reference to the drawings.

<Overview of Device>

First, an overview of a wireless system device according to the present exemplary embodiment will be described.

Figure 1:
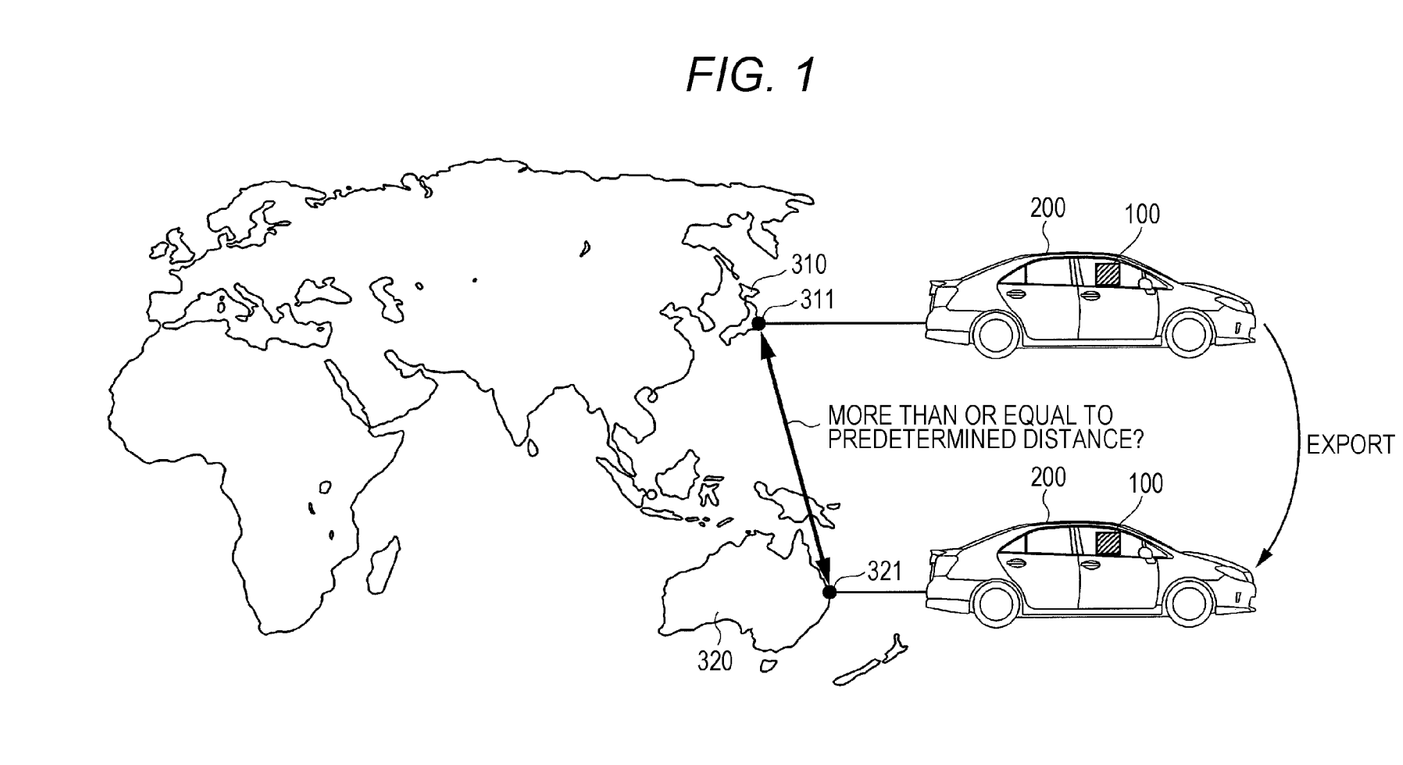
FIG. 1 is a schematic diagram for illustrating an overview of a wireless system device according to an exemplary embodiment of the present disclosure.

FIG. 1 is a schematic diagram for illustrating the overview of the wireless system device according to the present exemplary embodiment.

As shown in FIG. 1, vehicle 200 on which wireless system device 100 is mounted is manufactured, for example, in Japan 310, and after that, vehicle 200 is exported to Australia 320 as a used vehicle and is used again. In this case, wireless system device 100 is an on-vehicle device compatible with the V2V communication system and the V2I communication system using the 760 MHz band in Japan 310 and broadcasts (transmits) vehicle information to the periphery autonomously at a predetermined cycle.

However, when vehicle 200 starts to be used again in Australia 320, if a radio signal is sent in a similar way to Japan 310, radio wave interference with other wireless communication systems can be caused.

To address this issue, the inventor of the present invention focused on the fact that vehicle 200 is transported for a long distance being loaded on a ship or the like when exported, and the inventor configured wireless system device 100 such that sending of a radio signal is restricted if vehicle 200 is transported for a long distance in the stop state.

Specifically, on the basis of the GNSS information or the like, wireless system device 100 obtains position 311 of vehicle 200 when vehicle 200 shifts from an operation state to a stop state, and obtains position 321 of vehicle 200 when vehicle 200 then shifts from the stop state to the operation state. Then, if a distance between positions 311 and 321 is more than or equal to a predetermined value, wireless system device 100 restricts (including "inhibits") the sending of a radio signal. Here, as the predetermined value, it is possible to employ the minimum value of the distance between, for example, Japan 310 and an area (foreign county) where a wireless communication system different from the wireless communication system in Japan 310 is employed.

Note that wireless system device 100 may be a device communicably connected to an electronic control unit (ECU; not shown in the drawings) of vehicle 200 or may be a device embedded in the ECU.

<Configuration of Device>

Next, a configuration of wireless system device 100 will be described.

Figure 2:
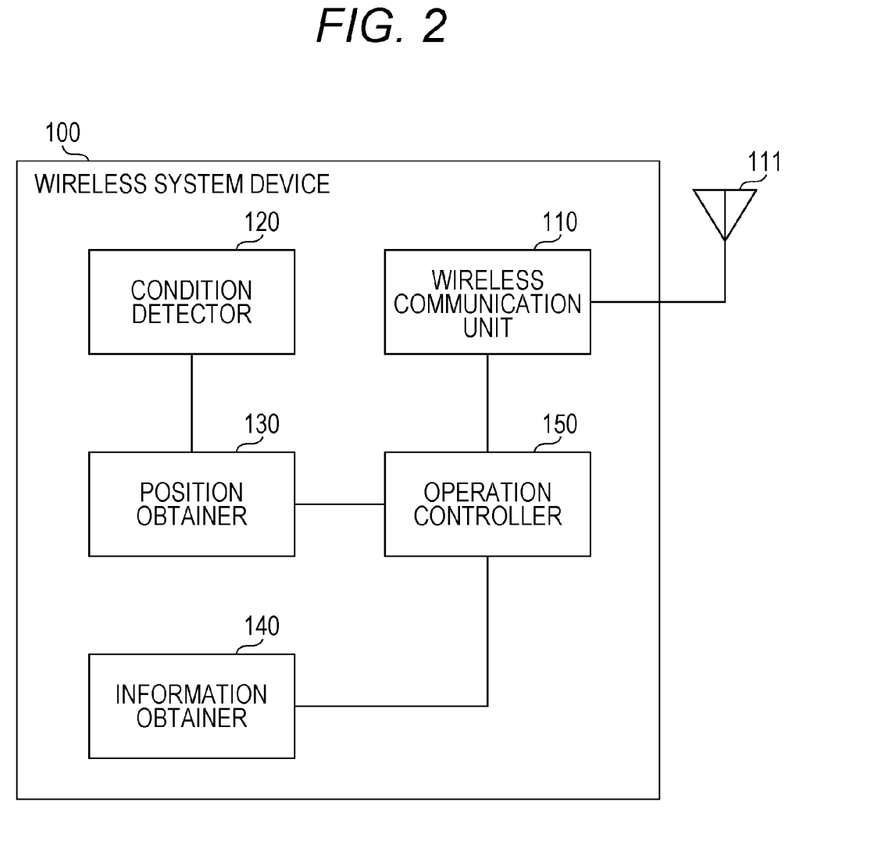
FIG. 2 is a block diagram showing an example of a configuration of the wireless system device according to the present exemplary embodiment.

FIG. 2 is a block diagram showing an example of the configuration of wireless system device 100.

With reference to FIG. 2, wireless system device 100 has wireless communication unit 110, condition detector 120, position obtainer 130, information obtainer 140, and operation controller 150.

Wireless communication unit 110 uses a wireless communication circuit (not shown) and antenna 111 and can transmit and receive a radio signal by using a plurality of predetermined communication modes while switching the plurality of predetermined communication modes. Here, the plurality of predetermined communication modes are, for example, communication modes compatible with vehicle-to-vehicle communication systems and/or vehicle-to-infrastructure communication systems, and the vehicle-to-vehicle communication systems and/or the vehicle-to-infrastructure communication systems each use frequency bands in different countries as frequency bands for wireless communication use.

With respect to each of the above plurality of predetermined communication modes (hereinafter, referred to as "communicable mode" when necessary), wireless communication unit 110 previously obtains and holds various configuration information (communication specifications) for performing wireless communication in the each of the communication modes. In wireless communication unit 110, for example, Japanese communication mode is set as an initial communication mode. In the Japanese communication mode, vehicle information is transmitted with a previously set predetermined communication frame cycle. Specifically, in an initial state, wireless communication unit 110 continues to autonomously and cyclically send a radio signal in the 760 MHz band, at least, when vehicle 200 is in the operation state.

Note that wireless communication unit 110 may obtain positional information, speed information, and the like of vehicle 200 necessary to transmit vehicle information, from various parts of the ECU of vehicle 200 or from condition detector 120, position obtainer 130, information obtainer 140, or operation controller 150 that will be described later.

In the following description, the "stop state" is a state in which functions of vehicle 200 are stopped, and is, for example, a state in which an engine (not shown) of vehicle 200 is stopped, or a state in which a main power supply or an accessory power supply of vehicle 200 (hereinafter, generally referred to as "power supply") is not on. That is, there is a possibility that vehicle 200 in the stop state is being transported as an export cargo. Further, the "operation state" is a state in which functions of vehicle 200 are not stopped, and is, for example, a state in which the engine of vehicle 200 is operating, or a state in which the power supply of vehicle 200 is on. That is, there is a low possibility that vehicle 200 in the operation state is being transported as an export cargo.

Condition detector 120 detects a first timing when vehicle 200 shifts from the operation state to the stop state, and detects a second timing when vehicle 200 shifts, first after the first timing, from the stop state to the operation state. Condition detector 120 obtains information indicating a state of operation of the engine and/or a state of the power supply of vehicle 200 from, for example, various parts of the ECU of vehicle 200, and determines the above first timing and second timing on the basis of the obtained information. Then, every time the first timing is detected, condition detector 120 communicates to position obtainer 130 that the first timing is detected, and every time the second timing is detected, condition detector 120 communicates to position obtainer 130 that the second timing is detected.

Position obtainer 130 has, for example, a GNSS receiver (not shown) and successively obtains a current position on the basis of GNSS information. Further, every time the detection of the first timing is communicated, position obtainer 130 obtains a current position, in other words, the first position, which is the position of vehicle 200 at the first timing. Further, every time the detection of the second timing is communicated, position obtainer 130 obtains a current position, in other words, the second position, which is the position of vehicle 200 at the second timing. Then, position obtainer 130 outputs to operation controller 150 the information indicating the obtained first position and second position.

The first timing is, for example, a timing when the power supply of vehicle 200 is turned off in a ship bound from Japan 310 to Australia 320, and the first position is, for example, position 311 in the area of Japan 310. Further, the second timing is, for example, a timing when the power supply of vehicle 200 is turned on in a ship on which vehicle 200 arrives at Australia 320, and the second position is, for example, position 321 in the area of Australia 320 (see FIG. 1).

Information obtainer 140 obtains, for each position, communicable area information indicating a communication mode usable at the each position, and outputs the communicable area information to operation controller 150. Information obtainer 140 may previously obtain and hold the communicable area information. Alternatively, information obtainer 140 may obtain the communicable area information by accessing, at a timing instructed by operation controller 150, a communication network such as the Internet or an information device such as a navigation system mounted on vehicle 200.

For example, the communicable area information describes, for each of small areas made by dividing an area (domestic area and foreign area) where vehicle 200 can be used, the communication mode usable in each small area in correspondence to the positional information of each small area.

Figure 3:
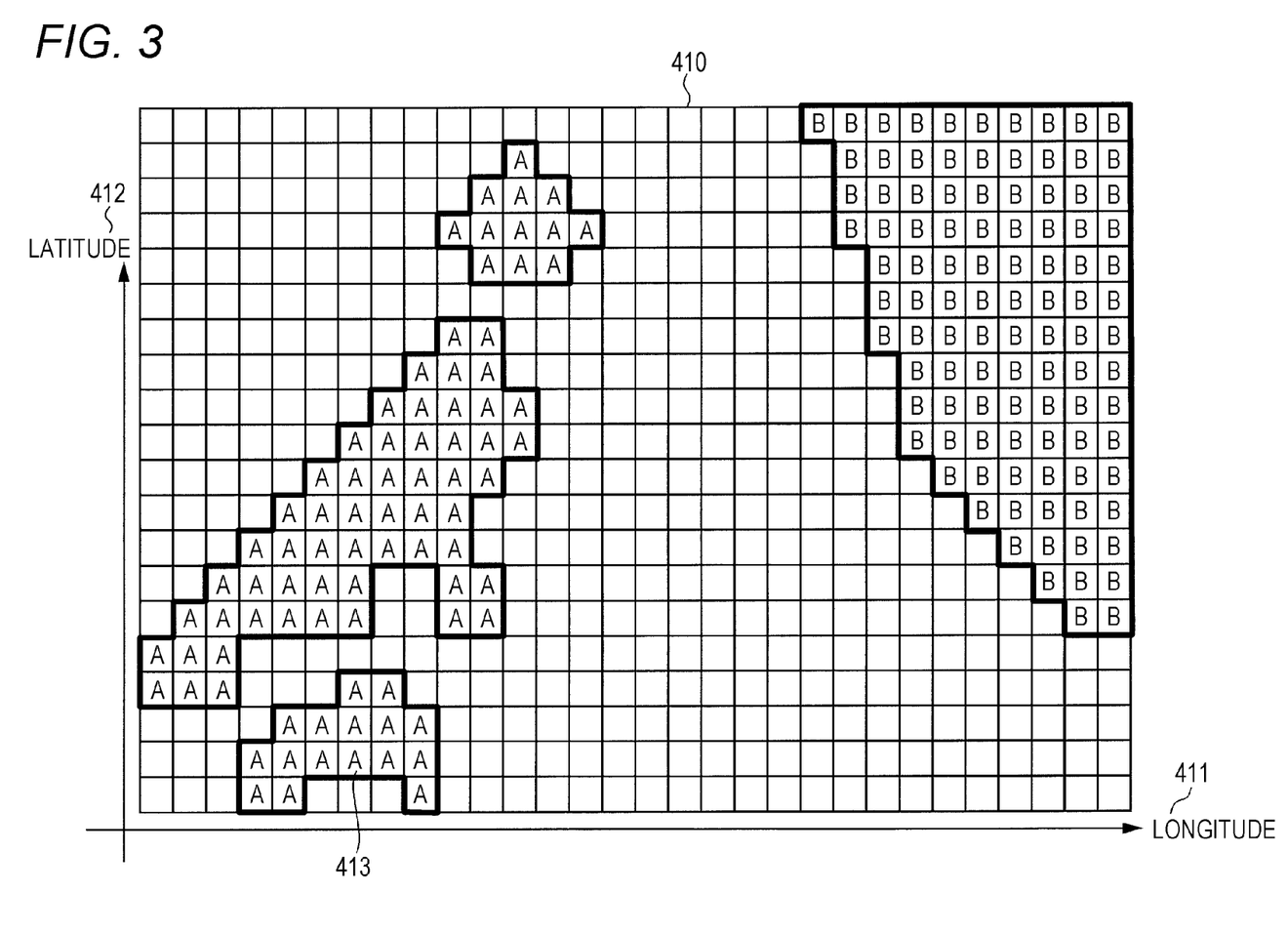
FIG. 3 is a schematic diagram showing an example of contents of communicable area information in the present exemplary embodiment.

FIG. 3 is a schematic diagram showing an example of contents of the communicable area information.

As shown in FIG. 3, small areas 413 are obtained in a matrix shape by dividing each of longitude 411 and latitude 412, and communicable area information 410 describes the communication mode usable in each of small areas 413. In an example of the drawing, symbol "A" is assigned to the communication mode named "communication mode A" usable in Japan 310, and symbol "B" is assigned to the communication mode named "communication mode B" usable in a foreign country, which is a foreign country viewed from Japan 310.

Operation controller 150 calculates a distance between the first position and the second position on the basis of the information having been output from position obtainer 130. Then, if the calculated distance is more than or equal to the above-mentioned predetermined value, operation controller 150 causes wireless communication unit 110 to stop autonomous and cyclic transmission of vehicle information, and starts to determine whether there is a communication mode usable at the current position. In order to make the determination, for example, operation controller 150 uses the above-mentioned communicable area information and the second position (which is the current position), or uses wireless communication unit 110 to monitor reception of the information transmitted from another vehicle or a roadside device.

Then, if there is the communication mode usable at the current position, operation controller 150 causes wireless communication unit 110 to restart autonomous and cyclic transmission of vehicle information by the usable communication mode (hereinafter, referred to as "usable mode").

Note that, although not shown in the drawing, wireless system device 100 includes, for example, a central processing unit (CPU), a storing medium such as a read only memory (ROM) storing a control program, and a working memory such as a random access memory (RAM) or a flash memory. In this case, functions of the above units are implemented by the CPU executing the control program.

For example, the above-mentioned information indicating the first position needs to be held without using electric power for a relatively long period of time at least while vehicle 200 is being in the stop state. Therefore, for example, position obtainer 130 records the information indicating the first position by using a flash memory.

If there is a high possibility that vehicle 200 is exported to a foreign country, in other words, if there is a high possibility that a wireless communication system environment has changed, wireless system device 100 having the above-described configuration can detect the change and can restrict transmission of vehicle information by a radio wave.

<Operation of Device>

Next, operation of wireless system device 100 will be described.

Figure 4:
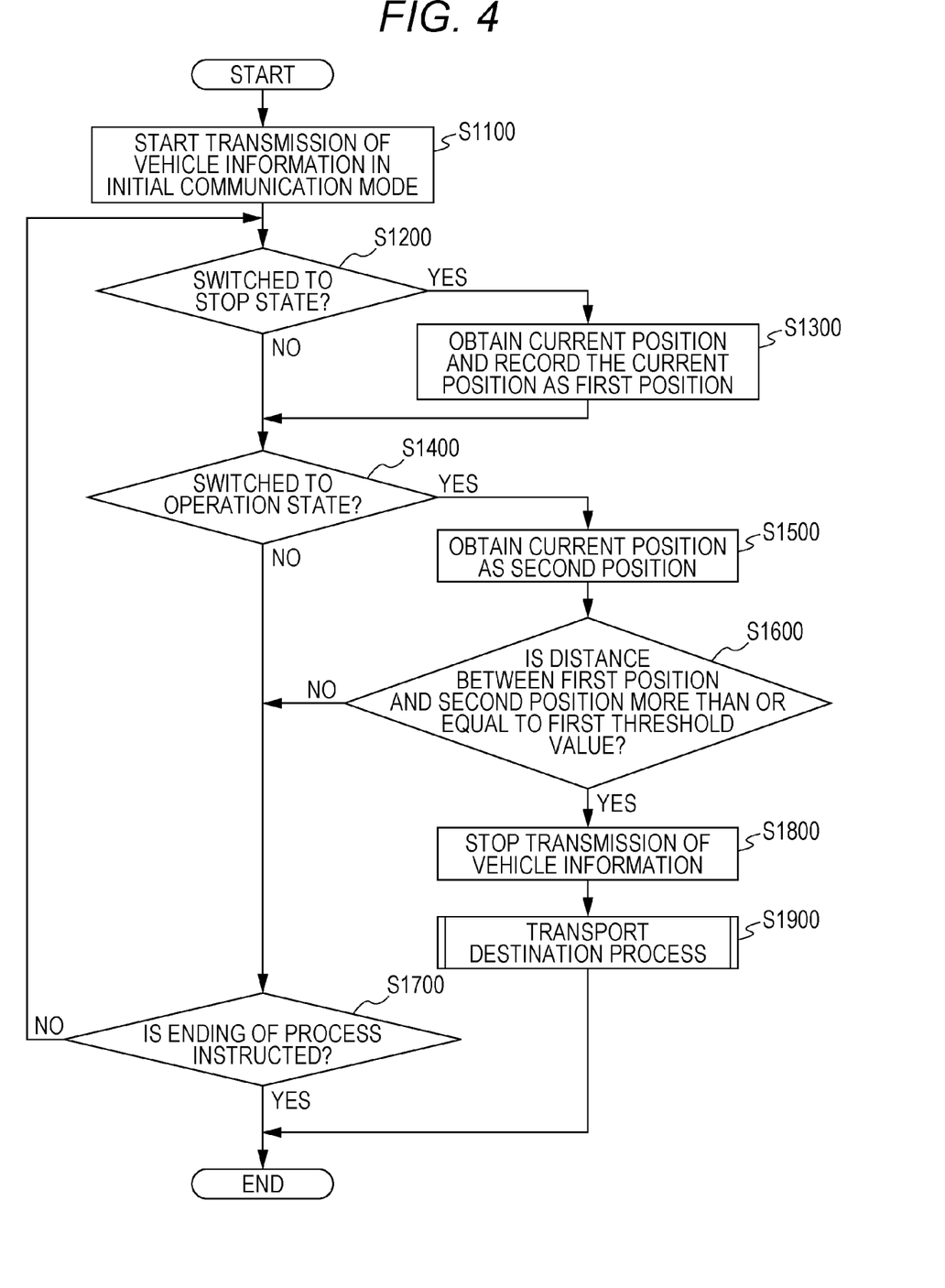
FIG. 4 is a flowchart showing an example of operation of the wireless system device according to the present exemplary embodiment.

FIG. 4 is a flowchart showing an example of the operation of wireless system device 100. For example, every time power supply from vehicle 200 is stopped, wireless system device 100 interrupts the below-described process, and every time the power supply from vehicle 200 is restarted, wireless system device 100 restarts the below-described process from the point where the process was interrupted. Wireless system device 100 records, for example, what point the process is interrupted at, by using, for example, a flash memory.

In step S1100, wireless communication unit 110 starts transmission of vehicle information in an initial communication mode. Specifically, wireless communication unit 110 starts, for example, operation in which the autonomous and cyclic transmission of vehicle information is performed while vehicle 200 is operating.

In step S1200, condition detector 120 determines whether vehicle 200 has shifted from the operation state to the stop state. In other words, condition detector 120 detects the first timing.

If the state has been switched to the stop state (S1200: YES), condition detector 120 advances the process to step S1300. If the state has not been switched to the stop state (S1200: NO), condition detector 120 advances the process to step S1400 to be described later. Note that if the state has not been switched to the stop state, it includes the case that the operation state continues and the case that the state has been the stop state from before.

In step S1300, position obtainer 130 obtains the current position, records the current position as the first position, and then advances the process to step S1400.

In step S1400, condition detector 120 determines whether vehicle 200 has shifted from the stop state to the operation state. That is, condition detector 120 detects the second timing.

If the state has been switched to the operation state (S1400: YES), condition detector 120 advances the process to step S1500. If the state has not been switched to the operation state (S1400: NO), condition detector 120 advances the process to step S1700. Note that if the state has not been switched to the operation state, it includes the case that the stop state continues and the case that the state has been the operation state from before.

In step S1500, position obtainer 130 obtains the current position as the second position.

In step S1600, operation controller 150 calculates the distance between the first position and the second position and determines whether the calculated distance is more than or equal to a first threshold value (which is the above-mentioned predetermined value). If the distance between the first position and the second position is not more than or equal to the first threshold value (S1600: NO), the operation controller 150 advances the process to step S1700.

Note that in the case that a plurality of sets of the first position and the second position have been obtained, the first position and the second position to be subjected to the calculation of the distance is the newest (last obtained) first position and second position.

In step S1700, condition detector 120 determines whether ending of the process is instructed by a user operation or the like. If ending of the process is not instructed (S1700: NO), condition detector 120 brings the process back to step S1200. If ending of the process is instructed (S1700: YES), condition detector 120 ends the series of processes.

That is, every time vehicle 200 shifts to the operation state, wireless system device 100 determines whether the distance from the position at which vehicle 200 last shifted to the stop state to the current position is more than or equal to the first threshold value. For example, while vehicle 200 is being used in Japan, the operation state and the stop state are alternately changing. In this case, vehicle 200 is normally parked in a parking lot, and the above distance is almost zero. Therefore, before vehicle 200 is exported, steps S1200 to S1700 are repeatedly performed.

If the distance between the position of the first position and the second position is more than or equal to the first threshold value (S1600: YES), operation controller 150 advances the process to step S1800.

In step S1800, operation controller 150 causes wireless communication unit 110 to stop an operation mode started in step S1100, in other words, autonomous and cyclic transmission of vehicle information. In other words, if a distance that vehicle 200 moved while being in the stop state is more than or equal to the first threshold value, operation controller 150 inhibits wireless communication unit 110 from performing the autonomous and cyclic radio signal transmission having been performed in a period at least before or at the first timing.

Then, in step S1900, wireless system device 100 performs a transport destination process. The transport destination process is a process to be performed at a transport destination to which vehicle 200 is exported, and if transmission of vehicle information is possible at the transport destination, the transmission is restarted.

For example, if vehicle 200 is exported, vehicle 200 is transported while being kept in the stop state. Therefore, the above distance is several thousand kilometers, for example. Therefore, after vehicle 200 is exported, the autonomous and cyclic transmission of vehicle information is once stopped, and the transport destination process is started.

Figure 5:
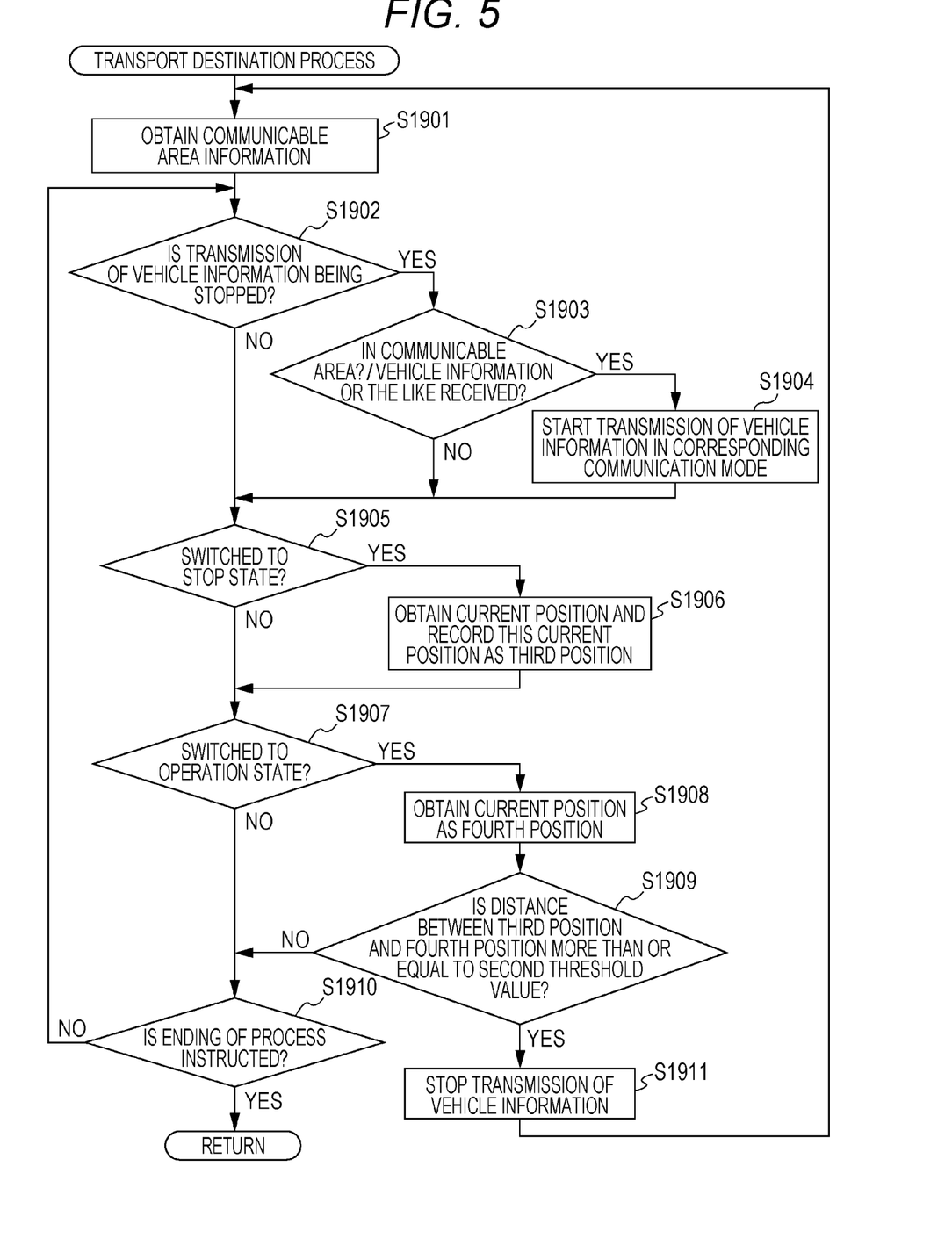
FIG. 5 is a flowchart showing an example of a transport destination process in the present exemplary embodiment.

FIG. 5 is a flowchart showing an example of the transport destination process (step S1900 in FIG. 4).

In step S1901, information obtainer 140 tries to obtain communicable area information 410 (see FIG. 3).

In step S1902, operation controller 150 determines whether the operation to stop the autonomous and cyclic transmission of vehicle information is performed on wireless communication unit 110. If the transmission of vehicle information is stopped (S1902: YES), operation controller 150 advances the process to step S1903. If the transmission of vehicle information is not stopped (S1902: NO), operation controller 150 advances the process to step S1905 to be described later.

In step S1903, operation controller 150 determines whether the current position is in an area where wireless communication unit 110 can perform the autonomous and cyclic transmission of vehicle information by using any communicable mode (hereinafter, referred to as "communicable area"). That is, operation controller 150 determines, on the basis of the communicable area information 410, whether the usable modes at the current position include at least one of the communicable modes of wireless communication unit 110.

Alternatively, operation controller 150 causes wireless communication unit 110 to wait for receiving vehicle information from another vehicle or traffic information from a roadside device (hereinafter, referred to as "vehicle information or the like") while switching the plurality of communicable modes. That is, wireless communication unit 110 waits for receiving a radio signal sent from a device other than wireless system device 100 by using a communicable mode (the radio signal is referred to as "another radio signal". Then, operation controller 150 determines whether vehicle information or the like have been received by any communicable mode. That is, operation controller 150 determines whether any communicable mode is used at the transport destination.

Note that operation controller 150 may perform both of the above determinations, may perform only one of the both, or may perform alternately both of the determinations each once or multiple times. Further, operation controller 150 obtains the current position by using, for example, position obtainer 130.

Further, when wireless communication unit 110 is waiting for receiving the vehicle information or the like in each of the communicable modes, operation controller 150 preferably controls wireless communication unit 110 such that wireless communication unit 110 tries to perform a reception process for receiving the vehicle information or the like with a cycle (for example, 1 s) longer than a corresponding communication frame cycle (for example, 100 ms). By this operation, it is possible to wait for receiving the vehicle information or the like with a reduced power consumption. A timing (reception slot) for which communication unit 110 should wait can be specified from, for example, time information contained in the GNSS information.

Operation controller 150 advances the process to step S1904 if at least one of the following conditions is satisfied (S1903: YES), the condition that the current position is determined to be in the communicable area, and the condition that the vehicle information or the like was received in any communicable mode. If none of the above two conditions is satisfied (S1903: NO), operation controller 150 advances the process to step S1905 to be described later. Note that if communicable area information 410 could not be received or if the information related to the current position is not included in the communicable area information 410, operation controller 150 determines that the current position is not in the communicable area.

In step S1904, operation controller 150 causes wireless communication unit 110 to start transmission of vehicle information in the usable communication mode, in other words, in the communication mode corresponding to the communicable area or the received vehicle information. That is, wireless communication unit 110 restarts operation in which the autonomous and cyclic transmission of vehicle information is performed while vehicle 200 is operating, by using configuration information of the communication mode usable at the transport destination (by following a corresponding communication specification). In other words, operation controller 150 lifts the inhibition of the autonomous and cyclic radio signal transmission imposed on wireless communication unit 110.

In step S1905, condition detector 120 determines whether vehicle 200 has switched from the operation state to the stop state. That is, condition detector 120 detects a third timing when vehicle 200 shifts from the operation state to the stop state at the transport destination.

If the state has been switched to the stop state (S1905: YES), condition detector 120 advances the process to step S1906. If the state has not been switched to the stop state (S1905: NO), condition detector 120 advances the process to step S1907.

In step S1906, position obtainer 130 obtains the current position, records the current position as the third position, and then advances the process to step S1907.

In step S1907, condition detector 120 determines whether vehicle 200 has shifted from the stop state to the operation state. That is, condition detector 120 detects a fourth timing when vehicle 200 shifts from the stop state to the operation state at the transport destination.

If the state has been switched to the operation state (S1907: YES), condition detector 120 advances the process to step S1908. If the state has not been switched to the operation state (S1907: NO), condition detector 120 advances the process to step S1910 to be described later.

In step S1908, position obtainer 130 obtains the current position as the fourth position.

In step S1909, operation controller 150 calculates the distance between the third position and the fourth position and determines whether the calculated distance is more than or equal to a second threshold value. Here, as the second threshold value, it is possible to employ a value determined, taking as a standard the minimum distance between a plurality of countries (areas) to which vehicle 200 can be exported. If the distance between the third position and the fourth position is not more than or equal to the second threshold value (S1909: NO), the operation controller 150 advances the process to step S1910.

In step S1910, condition detector 120 determines whether ending of the process is instructed by a user operation or the like. If ending of the process is not instructed (S1910: NO), condition detector 120 brings the process back to step S1902. If ending of the process is instructed (S1910: YES), condition detector 120 brings the process back to FIG. 4 to end the series of processes.

That is, also at the transport destination (export destination), every time vehicle 200 shifts to the operation state, wireless system device 100 determines whether the distance from the position at which vehicle 200 last shifted to the stop state to the current position is more than or equal to the second threshold value. For example, while vehicle 200 is being used in the country of the export destination, the above distance is almost zero in the same way as in Japan. Therefore, before vehicle 200 is further exported to another country, steps S1902 to S1910 are repeatedly performed.

If the distance between the third position and the fourth position is more than or equal to the second threshold value (S1909: YES), operation controller 150 advances the process to step S1911.

In step S1911, operation controller 150 causes wireless communication unit 110 to stop an operation mode started in step S1904, which operation is specifically the autonomous and cyclic transmission of vehicle information, and operation controller 150 brings the process back to S1901. Note that, if the autonomous and cyclic transmission of vehicle information was not started in step S1904, operation controller 150 brings the process back to step S1901 without performing any processing.

That is, every time export (transport) is further repeated, wireless system device 100 stops the autonomous and cyclic transmission of vehicle information to avoid occurrence of radio wave interference at the transport destination.

By the above operation, if there is a high possibility that vehicle 200 is transported between areas where usable wireless communication system is different, wireless system device 100 can detect the transport and can restrict transmission of vehicle information by a radio wave.

Note that, if the autonomous and cyclic transmission of information has been restarted in the first transport destination (second country), the above-mentioned third and fourth timings and the third and fourth positions are respectively considered as the first and second timings and the first and second positions.

<Effects of the Present Exemplary Embodiment>

As described above, wireless system device 100 according to the present exemplary embodiment is a device to be mounted on vehicle 200. Wireless system device 100 according to the present exemplary embodiment includes: wireless communication unit 110 that transmits a radio signal; and condition detector 120 that detects a first timing and a second timing. The first timing is a timing when vehicle 200 shifts from an operation state to a stop state. The second timing is a timing when vehicle 200 shifts from the stop state to the operation state for a first time after the first timing. Further, wireless system device 100 according to the present exemplary embodiment includes: position obtainer 130 that detects a first position and a second position; and operation controller 150 that controls operation of wireless communication unit 110 on the basis of a distance between the first position and the second position. The first position is a position at which vehicle 200 is at the first timing. The second position is a position at which vehicle 200 is at the second timing.

This configuration enables wireless system device 100 according to the present exemplary embodiment to more reliably avoid occurrence of radio wave interference with other wireless communication systems.

A wireless communication control method of the present exemplary embodiment is a wireless communication control method that controls a wireless communication unit mounted on a vehicle. The wireless communication control method according to the present exemplary embodiment includes: detecting a first timing when a vehicle shifts from an operation state to a stop state; and obtaining a first position that is a position where the vehicle is at the first timing. Further, the wireless communication control method according to the present exemplary embodiment includes: detecting a second timing when the vehicle shifts from the stop state to the operation state for a first time after the first timing; and obtaining a second position that is a position where the vehicle is at the second timing. Further, the wireless communication control method according to the present exemplary embodiment includes controlling operation transmission of a radio signal by a wireless communication unit based on a distance between the first position and the second position.

This configuration enables the wireless communication control method according to the present exemplary embodiment to more reliably avoid occurrence of radio wave interference with other wireless communication systems.

Modified Examples of the Present Exemplary Embodiment

The above-mentioned example does not limit the content and aspect of the communicable area information, and does not limit the method of determining a usable mode on the basis of the communicable area information.

For example, the communicable area information may be information that indicates, for each group of continuous areas in which an identical communication mode can be used, a position of a boundary between the each group of continuous areas and another area adjacent to the each group of continuous areas. In this case, on the basis of the communicable area information, operation controller 150 may determine a correction area that is in the group of continuous areas containing the second position and is apart from the boundary of the group of continuous areas. Then, if the second position is in the determined correction area, operation controller 150 may determine that the communication mode usable in the group of continuous areas is the usable mode. For example, operation controller 150 determines as the correction area the area made by shrinking the group of continuous areas by a predetermined distance (for example, 100 m) from each position of the boundary. As the predetermined distance, it is possible to employ a value corresponding to the maximum detection error of the position, for example.

Even in the case that communication areas overlap each other or there is a detection error of position, this configuration can more reliably avoid occurrence of radio wave interference with other wireless communication systems.

Note that wireless system device 100 does not necessarily have to perform the above-mentioned transport destination process. Alternatively, wireless system device 100 may perform a part of the above-mentioned transport destination process. For example, wireless system device 100 does not have to perform the process about the communicable area information, and may be configured not to consider the export to third countries by performing only the process of steps S1902 to S1904. Conversely, wireless system device 100 may add another condition to the control of the operation of wireless communication unit 110. For example, in the case that vehicle information or the like is received at the transport destination, if it is determined on the basis of the received information or the like that transmission of the vehicle information is allowed, wireless system device 100 may restart the transmission of the vehicle information.

Note that the method of detecting the first to fourth timings, the method of obtaining the first to fourth position, and the method of obtaining the communicable area information are not limited to the above-mentioned example. Further, the first and second threshold values may be identical or different. Further, operation controller 150 may switch each of the first and second threshold values between different values previously determined for each region (country). For example, in the case that the first position is in a region such as Europe that is close in distance to another area having a different wireless communication system, operation controller 150 uses as the first value a smaller value than in the case that the first position is in a country such as Japan that is distant from another country having a different wireless communication system.

Further, the content of the control, by operation controller 150, to the operation of wireless communication unit 110 is not limited to the above-mentioned example. For example, in the case that the distance between the first position and the second position is more than or equal to the first threshold value, operation controller 150 may not inhibit the transmission of a radio signal by wireless communication unit 110 but apply restriction other than inhibition of the transmission of a radio signal. Examples of such a restriction include lengthening the sending period, lowering the signal strength, and sending only in the case that a predetermined condition such as a case of emergency is satisfied.

Note that the transmission of a radio signal to be controlled by operation controller 150 is not limited to the above-mentioned example. For example, operation controller 150 may restrict, on the basis of the distance between the first position and the second position, the transmission of a radio signal performed by wireless communication unit 110 not autonomously or not cyclically.

Further, a part of the configuration of wireless system device 100 may be physically apart from the other configuration of the device. In this case, each of the plurality of parts apart from each other needs to have a communication unit to communicate with each other.

<Summary of the Present Disclosure>

A wireless system device according the present disclosure is a wireless system device to be mounted on a vehicle. The wireless system device includes a wireless communication unit, a condition detector, a position obtainer, and an operation controller. The wireless communication unit transmits a radio signal. The condition detector detects a first timing and a second timing. The first timing is a timing when the vehicle shifts from an operation state to a stop state. The second timing is a timing when the vehicle shifts from the stop state to the operation state for a first time after the first timing. The position obtainer obtains a first position and a second position. The first position is a position where the vehicle is at the first timing. The second position is a position where the vehicle is at the second timing. The operation controller controls operation of wireless communication unit based on a distance between the first position and the second position.

In the above wireless system device, the position obtainer may obtain the first position and the second position by obtaining current positions of the vehicle at the first timing and the second timing, respectively, and the operation controller may control the operation of the wireless communication unit by determining the distance at least at the second timing.

In the above wireless system device, wireless communication unit performs autonomous and cyclic radio signal transmission in a period at least before or at the first timing, and when the distance is more than or equal to a first threshold value, the operation controller may inhibit the wireless communication unit from performing the autonomous and cyclic radio signal transmission.

In the above wireless system device, the wireless communication unit may transmit and receive a radio signal by using a predetermined communication mode, and may wait, at least after or at the second timing, for receiving another radio signal that is a radio signal transmitted from a device other than the wireless system device by using the predetermined communication mode. When the other radio signal is received, the operation controller may lift the inhibition of the autonomous and cyclic radio signal transmission.

The above wireless system device may have an information obtainer that obtains, for each position, communicable area information indicating a communication mode usable in the each position. The wireless communication unit may transmit and receive a radio signal by using a predetermined communication mode. The operation controller may determine, on the basis of the obtained communicable area information, a usable mode that is a communication mode usable at the second position, and when the predetermined communication mode is included in the determined usable mode, the operation controller may lift the inhibition of the autonomous and cyclic radio signal transmission.

In the above wireless system device, the communicable area information may indicate, for each of continuous areas where an identical communication mode is usable, a position of a boundary between each of the continuous areas and another area adjacent to each of the continuous areas. The operation controller may determine, based on the communicable area information, a correction area that is in each of the continuous areas containing the second position and is apart from the boundary of each of the continuous areas, and when the second position is in the determined correction area, the operation controller may determine that the communication mode usable in each of the continuous areas is the usable mode.

In the above wireless system device, the wireless communication unit may transmit and receive the radio signal by using a plurality of predetermined communication modes while switching between the plurality of predetermined communication modes, and when a communication mode usable at the second position is included in the plurality of predetermined communication modes, the operation controller may lift the inhibition of the autonomous and cyclic radio signal transmission in the usable communication mode.

In the above-mentioned wireless system device, the wireless communication unit may wait, in each of the plurality of predetermined communication mode and at least after or at the second timing, for receiving another radio signal transmitted from a device other than the wireless system device by using one of the predetermined communication modes. When the other radio signal is received in any one of the plurality of predetermined communication modes, the operation controller may determine that the one of the predetermined communication modes is the communication mode usable at the second position.

In the above wireless system device, a predetermined communication frame cycle may be set for each of the plurality of predetermined communication modes. In the case that the operation controller waits for receiving another radio signal in each of the plurality of predetermined communication modes at least after or at the second timing, the operation controller may try to perform a reception process for receiving another radio signal at a cycle longer than the predetermined communication frame cycle.

In the above-mentioned wireless system device, it is described that the wireless communication unit continues, in the initial state, to transmit a radio signal in the 760 MHz band autonomously and cyclically at least while vehicle 200 is in an operation state; however, the frequency band to be used is not limited to the above frequency band, and a frequency band other than the 760 MHz band may be used.

A wireless communication control method of the present disclosure is a wireless communication control method that controls a wireless communication unit mounted on a vehicle. The wireless communication control method includes: detecting a first timing when a vehicle shifts from an operation state to a stop state; and obtaining a first position that is a position where the vehicle is at the first timing. Further, the wireless communication control method includes: detecting a second timing when the vehicle shifts from the stop state to the operation state for a first time after the first timing; and obtaining a second position that is a position where the vehicle is at the second timing. Further, the wireless communication control method includes controlling operation of transmission of a radio signal by a wireless communication unit, based on a distance between the first position and the second position.

INDUSTRIAL APPLICABILITY

A wireless system device and wireless communication control method according to the present disclosure is useful as a wireless system device and a wireless communication control method in which it is possible to more reliably avoid occurrence of radio wave interference with other wireless communication systems.

REFERENCE MARKS IN THE DRAWINGS 100 wireless system device
110 wireless communication unit
111 antenna
120 condition detector
130 position obtainer
140 information obtainer
150 operation controller
200 vehicle
310 Japan
311 position
320 Australia
321 position
410 communicable area information
411 longitude
412 latitude
413 small area

The invention claimed is:
1. A wireless system device configured to be mounted on a vehicle, the wireless system device comprising:
a wireless communicator configured to transmit a cyclic radio signal;
a position obtainer configured to obtain a position of the vehicle, wherein:
while the wireless communicator transmits the cyclic radio signal, when the vehicle shifts from an operating state to a stop state, the position obtainer obtains first position coordinates of the vehicle,
after the position obtainer obtains the first position coordinates of the vehicle, when the vehicle shifts from the stop state to the operating state, the position obtainer obtains second position coordinates of the vehicle,
after the position obtainer obtains the second position coordinates of the vehicle, when a distance between the first position coordinates and the second position coordinates is more than a threshold, the wireless communicator stops transmitting the cyclic radio signal thereby avoiding radio signal interference with other wireless communication systems, and after the wireless communicator stops transmitting the cyclic radio signal, when the wireless communicator receives a radio signal by using a predetermined communication mode, the wireless communicator starts transmitting the cyclic radio signal.

2. The wireless system device according to claim 1, further comprising an operation controller configured to:
   while the wireless communicator transmits the cyclic radio signal, when the vehicle shifts from the operating state to the stop state, cause the position obtainer to obtain the first position coordinates of the vehicle,
   after the position obtainer obtains the first position coordinates of the vehicle, when the vehicle shifts from the stop state to the operating state, cause the position obtainer to obtain the second position coordinates of the vehicle,
   after the position obtainer obtains the second position coordinates of the vehicle, when the distance between the first position coordinates and the second position coordinates is more than the threshold, cause the wireless communicator to stop transmitting the cyclic radio signal,
   after the wireless communicator stops transmitting the cyclic radio signal, when the wireless communicator receives the radio signal by using the predetermined communication mode, cause the wireless communicator to start transmitting the cyclic radio signal.

3. The wireless system device according to claim 1, wherein the cyclic radio signal includes vehicle information, the vehicle information indicating at least one of a position of the vehicle and a running speed of the vehicle.

4. The wireless system device according to claim 1, wherein the wireless communicator receives the radio signal by using the predetermined communication mode, the radio signal being transmitted from a device other than the wireless system.

5. The wireless system device according to claim 1, wherein:
   the wireless communicator configured to transmit and receive a radio signal by using at least two communication modes, and
   the predetermined communication mode is one of the at least two communication modes.

6. The wireless system device according to claim 1, wherein after the wireless communicator stops transmitting the cyclic radio signal, the wireless communicator wait to receive the radio signal by using the predetermined communication mode.

7. The wireless system device according to claim 6, wherein the wireless communicator waits to receive the radio signal with a first time window, the first time window being longer than one communication frame of the predetermined communication mode.

8. A wireless communication control method for a wireless system device configured to be mounted on a vehicle, the wireless system device comprising:
   a wireless communicator configured to transmit a cyclic radio signal;
   a position obtainer configured to obtain a position of the vehicle, wherein:
   while the wireless communicator transmits the cyclic radio signal, when the vehicle shifts from an operating state to a stop state, the position obtainer obtains first position coordinates of the vehicle,
   after the position obtainer obtains the first position coordinates of the vehicle, when the vehicle shifts from the stop state to the operating state, the position obtainer obtains second position coordinates of the vehicle,
   after the position obtainer obtains the second position coordinates of the vehicle, when a distance between the first position coordinates and the second position coordinates is more than a threshold, the wireless communicator stops transmitting the cyclic radio signal thereby avoiding radio signal interference with other wireless communication systems, and
   after the wireless communicator stops transmitting the cyclic radio signal, when the wireless communicator receives a radio signal by using a predetermined communication mode, the wireless communicator starts transmitting the cyclic radio signal.

9. The wireless communication control method according to claim 8, wherein the cyclic radio signal includes vehicle information, the vehicle information indicating at least one of a position of the vehicle and a running speed of the vehicle.

10. The wireless communication control method according to claim 8, wherein:
    the wireless communicator is further configured to transmit and receive a radio signal by using at least two communication modes, and
    the predetermined communication mode is one of the at least two communication modes.

11. The wireless communication control method according to claim 8, wherein after the wireless communicator stops transmitting the cyclic radio signal, the wireless communicator waits to receive the radio signal by using the predetermined communication mode.

12. The wireless communication control method according to claim 11, wherein the wireless communicator waits to receive the radio signal with a first time window, the first time window being longer than one communication frame of the predetermined communication mode.

* * * * *